United States Patent Office 3,574,147
Patented Apr. 6, 1971

3,574,147
GASKET COMPOSITION
Donald A. Giessler and Floyd Arthur Ratliff, Muncie, Ind., assignors to Ball Corporation, Muncie, Ind.
No Drawing. Continuation of application Ser. No. 378,955, June 29, 1964. This application June 11, 1968, Ser. No. 751,642
Int. Cl. C08f *47/10;* C08g *53/10*
U.S. Cl. 260—2.5                     12 Claims

ABSTRACT OF THE DISCLOSURE

Home canning lid having as the sealing portion thereof a cellular plastisol gasket formed from a vinyl polymer, a phenol-formaldehyde resin, a filler, at least one plasticizer, and a blowing agent, and said gasket composition which is capable of withstanding the pressures, temperatures, and abrasion inflicted upon a home canning lid.

---

This application is a continuation of copending U.S. application Ser. No. 378,955, filed June 29, 1964, entitled "Gasket Composition" by Donald A. Giessler et al.

This invention relates to a new and improved gasket composition for use in forming a sealing gasket for a container lid and more particularly relates to a novel cellular gasket composition for a gasket of a home canning lid or closure.

While vinyl plastisols have been widely used in gaskets for closures for a number of years, vinyl plastisol gaskets have not been successful with home canning lids or closures. The performance of home canning lids is different from that of commercial closures in that the home canning lids are often employed with used containers or jars rather than new glassware which has been carefully inspected.

Another difference is the variability in processing procedure as it is conducted by the large number of home canners throughout the country. Thus, home canning lids are subjected to a much greater variation in operating conditions than would normally be encountered by commercial closures.

In view of the above differences between the two types of closures, it was not unexpected that vinyl plastisol gaskets which had proven to be useful with commercial closures were not successful with home canning lids.

Attempts were made to modify the gasket formulations in order to overcome some of the problems encountered in the use of vinyl plastisols for home canning lids. Among the problems encountered was the lack of adequate venting of the jar during the heating step or excessive venting which resulted in a loss of liquid. Moreover, the sealing of the jar after the processing was not always satisfactory which resulted in spoilage of the contents of the jar. Also, some gaskets were displaced from the sealing surface during the venting step. In addition, certain gaskets were severed by the top of the jar as the lid was tightened onto the jar.

In view of the above and other deficiencies and problems of home canning gasket materials heretofore proposed, it was completely unexpected and surprising to discover a novel vinyl plastisol gasket composition for home canning which overcomes many of the deficiencies of prior materials and, in addition, provides advantages and benefits heretofore considered unattainable. The gasket of the invention provides excellent sealing, removal, storage and food inertness characteristics. Furthermore, the gasket does not cut through in use nor is the gasket displaced from the lid during venting. Moreover, the use of the gasket composition provides home canning lids which vent at substantially uniform pressures without liquid loss while retaining good sealing characteristics. In addition, the gasket material does not transfer odor or taste characteristics to the food in the jar. Furthermore, the gasket composition of the invention provides an additional advantage in that it forms a cellular structure which is substantially free of surface holes which might cause leaking or contamination of the product. Since the gasket produced has a cellular structure, only a minimum amount of the gasket composition is required to produce a soft, resilient gasket which has excellent performance characteristics. Moreover, the gasket composition of the invention is relatively low in cost and can be formulated without difficulty.

The gasket composition of the present invention comprises a plastisol mixture comprising a vinyl polymer, a phenolic resin, a plasticizer and a blowing agent.

The vinyl polymer may be made by known polymerization processes, for example, emulsion or suspension systems. Emulsion polymerization generally produces dense spherical particles having an average size of the order of about 1–2 microns, while suspension polymerization produces larger particles, e.g., of an average size of about 10 microns, but which otherwise are similar. The vinyl polymer generally is polyvinyl chloride or a copolymer of vinyl chloride with, for example, vinyl acetate, vinylidene chloride, or a similar vinyl type monomer. The copolymers are generally produced by suspension polymerization while the homopolymers are usually produced by emulsion polymerization. The specific viscosity of the vinyl polymer is advantageously between about 0.3 and 0.6 and preferably between about 0.35 and 0.45 as measured by ASTM Test Method D–1243, Method B.

The phenolic resin employed in the plastisol of the invention may be any of the heat-reactive phenolic resins commercially available. The phenolic resin employed advantageously is in a finely divided form and preferably is combined with hexamethylene tetramine catalyst. Examples of typical resins include phenol-formaldehyde resin, an alkylated phenol-formaldehyde resin, a phenyl-phenol-formaldehyde resin, etc.

The plasticizer employed in the gasket composition may be one of the known plasticizers for vinyl polymers and advantageously is an epoxide, a glycolate or a diester plasticizer. The epoxide may be formed by epoxidizing an unsaturated, organic compound such as an olefin and particularly an olefin having isolated double bonds, such as double bonds near alkyl groups; e.g., fats, oils, esters, etc., for example, an epoxidized oil, such as soybean oil, linseed oil, safflower oil and the like. Preferably, the epoxide has an iodine number not greater than about 6 and an oxirane oxygen content of at least about 6%.

Examples of other plasticizers which advantageously may be employed include glycolates such as butyl phthalyl butyl glycolate; diesters, for example, a diester of a dibasic acid such as sebacic, adipic, and azelaic acids; and the like. Particularly useful alone or in combination with the epoxide plasticizer in the gasket composition of the invention are diesters of sebacic acid with alkyl alcohols having 4 to 8 carbon atoms, diesters of azelaic acid with alkyl alcohols having 4 to 8 carbon atoms, and mixtures of diesters, with diesters of adipic acid with alkyl alcohols having 4 to 16 carbon atoms being preferred.

The blowing agent incorporated in the gasket composition may be one of the known blowing agents for vinyl polymers. For example, diazoamino benzene, dinitrosopentamethylene tetramine, 4,4′-oxybis (benzene sulfonyl hydrazide) and the like may be employed with azobisformamide being preferred.

The gasket composition of the invention advantageously also includes a filler such as barium sulfate, calcium carbonate, or the like. Advantgaeously, barium sulfate is employed as the filler because it is substantially completely inert to the foods which it contacts as a component of the gasket.

In addition to the above components, other materials may be incorporated in the gasket composition of the invention providing they do not adversely affect the benefits and advantages of the invention. For example, pigments, stabilizers, lubricants, emulsifying or dispersing agents, and the like may be employed in the gasket composition.

The proportions of the various ingredients in the gasket composition may vary over wide ranges with the proportions by weight of the filler and plasticizer being somewhat greater than that of the vinyl polymer employed. The phenolic resin and the blowing agent normally each comprise only a small percentage of the composition as compared with the three major components above.

The filler may be employed in widely varying amounts without deleteriously affecting the gasket composition of the invention. For example, the proportion may vary from about 50 parts up to 500 or more parts by weight per 100 parts of the vinyl polymer and preferably between about 100 and 400 parts by weight.

The proportion of the plasticizer in the gasket composition has a greater affect on the performance characteristics thereof and advantageously comprises between about 100 and 200 parts by weight for each 100 parts of the vinyl polymer with between about 125 and 175 parts preferred.

The proportion of the phenolic resin is advantageously in the range of between about 1 and 10 parts by weight per 100 parts of the vinyl polymer and preferably between about 2 and 8 parts.

The blowing agent advantageously comprises between about 1 and 5 parts per 100 parts of the vinyl polymer. Greater amounts of blowing agents do not appear to provide any additional benefits. The other materials employed in the gasket composition such as the lubricants, stabilizers, pigments, etc. generally also comprise only a fraction of the vinyl polymer and advantageously comprise less than about 15 or 20 parts by weight per 100 parts of the vinyl polymer.

The gasket composition of the invention is advantageously formed into a sealing gasket by applying the composition directly to a closure or the gasket may be formed separately and then combined with the closure. Preferably, the gasket is fused at a temperature of about 325–400° F. during which time the blowing agent decomposes and releases a gas to produce the cellular structure of the gasket.

The following examples describe the gasket composition of the invention in greater detail and are intended to illustrate rather than to restrict the scope of the invention. In the examples, parts and percentages are by weight.

EXAMPLE I

About 58 parts of a 1–2 micron average particle size vinyl chloride polymer having a specific viscosity of about 0.35 and 42 parts of a 10 micron average particle size copolymer of vinyl chloride and vinylidene chloride having a specific viscosity of about 0.4 were mixed with about 300 parts of barium sulfate having an average particle size of about 10 microns, 50 parts of epoxidized soybean oil, 100 parts of dioctyl adipate, 2 parts of azobisformamide, and 3 parts of phenol-formaldeyde resin powder having a specific gravity of about 1.25 and of a size passing a 200 mesh screen, plus suitable pigments, lubricants and stabilizers. The mixing was accomplished with a high-speed mixer, and agitation was continued until a uniform dispersion was formed. The dispersion had a viscosity of about 2000 centiposes at room temperature.

A portion of the above dispersion was used to form a gasket in snap-down lids of the home canning type by placing a 1200 milligram portion thereof into a groove formed in the top of each closure. The closures were then heated to a temperature of about 380° F. for about 2 minutes to complete the formation of the gaskets. The gaskets were examined and found to be soft and resilient and free of surface holes.

The closures were then applied to a number of home canning glass jars filled with various foods and processed to determine the performance characteristics of the gaskets. The containers were found to be tightly sealed with no leakage and with sufficient vacuum within the sealed jars. After an extended storage period, the closures were removed, and the removal was accomplished without undue effort. The gaskets were examined and found to be intact and did not exhibit any deterioration. Likewise, the food was sampled and found to be in good condition and not adulterated or composed.

EXAMPLE II

The procedure of this example was the same as that of Example I, except that the gasket composition contained about 6 parts of the phenol-formaldehyde resin powder.

The gasket composition was used in the formation of gaskets as in Example I, and tests of the resulting closures indicated that the gaskets performed in a manner similar to those of Example I.

EXAMPLE III

The procedure of this example was the same as that of Example I, except that 150 parts of dioctyl adipate plasticizer were employed in place of the plasticizers employed in Example I. The gaskets formed showed similar performance characteristics to the gaskets of the previous examples.

EXAMPLE IV

The procedure of this example was the same as that of Example I, except that instead of using a mixture of vinyl polymers, the vinyl polymer was 100 parts of polyvinyl chloride of a 1–2 micron average particle size having a specific viscosity of about 0.35.

The results achieved when gaskets were formed with the above composition were similar to those achieved with the gaskets of the previous examples.

The above description and examples show that the novel gasket composition of the present invention overcomes many of the difficulties of prior home canning gasket compositions and provides advantages and benefits heretofore considered unattainable. Gaskets made with the vinyl plastisol gasket composition of the invention provide excellent sealing, removal, storage, and food inertness performance characteristics. Moreover, the gaskets have a uniform cellular structure which permits the use of a minimum amount of gasket material to achieve a soft, resilient gasket which is not displaced or cut through in use. Furthermore, the gasket composition of the invention may be formulated without difficulty and is relatively low in cost. In addition, the gasket composition may be easily and conveniently applied to closures. In addition, the present invention provides for the successful use of vinyl plastisol compositions as gaskets in home canning lids which heretofore was considered unattainable. The use of vinyl plastisols provides a considerable saving in processing time as compared with the use of conventional rubber latex, heretofore employed.

From the above description of the invention, it will be apparent that various modifications in the specific formulations and procedures described may be made within the scope of the invention. Therefore, the invention is not intended to be limited to the specific details described, except as may be required by the following claims.

What is claimed is:

1. A plastisol gasket composition for use in forming a gasket for a home canning lid consisting essentially of a vinyl chloride polymer, a powdered phenol-formaldehyde resin, a filler, a plasticizer and a blowing agent, said composition including between about 50 and 500 parts by weight of said filler and between about 100 and 200 parts by weight of said plasticizer for each 100 parts of vinyl chloride polymer.

2. A gasket composition for use in forming a cellular gasket as set forth in claim 1, with said phenol-formaldehyde resin being included in amounts between about 1 and 10 parts by weight for each 100 parts of vinyl chloride polymer.

3. A plastisol gasket composition for use in forming a cellular gasket for use in a home canning lid consisting essentially of a vinyl chloride polymer, a powdered phenol-formaldehyde resin, a barium sulfate filler, an epoxide plasticizer, a diester plasticizer and a blowing agent, said phenolic resin being included in amounts between about 1 and 10 parts by weight, said filler being included in amounts between about 50 and 500 parts by weight, said plasticizers being included in amounts between about 100 and 200 parts by weight, and said blowing agent being included in amounts between about 1 and 5 parts by weight for each 100 parts of vinyl chloride polymer.

4. A plastisol gasket composition for use in forming a cellular gasket for use in a home canning lid, consisting essentially of a vinyl chloride polymer, a powdered phenol-formaldehyde resin, a barium sulfate filler, an epoxide plasticizer, an adipate plasticizer and a blowing agent, said phenolic resin being included in amounts between about 2 and 8 parts by weight, said filler being included in amounts between about 100 and 400 parts by weight, said plasticizers being included in amounts between about 125 and 175 parts by weight, and said blowing agent being included in amounts between about 1 and 5 parts by weight for each 100 parts of vinyl chloride polymer.

5. A cellular gasket for a home canning lid consisting essentially of a vinyl chloride polymer, a powdered phenol-formaldehyde resin, a filler and a plasticizer, said filler being included in amounts between about 50 and 500 parts by weight and said plasticizer being included in amounts between about 100 and 200 parts by weight for each 100 parts of vinyl chloride polymer.

6. A cellular gasket for a home canning lid as set forth in claim 5, with said phenol-formaldehyde resin being included in amounts between about 1 and 10 parts by weight for each 100 parts of vinyl chloride polymer.

7. A cellular gasket for use in a home canning lid consisting essentially of a vinyl chloride polymer, a powdered phenol-formaldehyde resin, a barium sulfate filler, an epoxide plasticizer and a diester plasticizer, said phenolic resin being included in amounts between about 1 and 10 parts by weight, said filler being included in amounts between about 50 and 500 parts by weight and said plasticizers being included in amounts between about 100 and 200 parts by weight for each 100 parts of vinyl chloride polymer.

8. A cellular gasket for use in a home canning lid consisting essentially of a vinyl chloride polymer, a powdered phenol-formaldehyde resin, a barium sulfate filler, an epoxide plasticizer and an adipate plasticizer, said phenolic resin being included in amounts between about 2 and 8 parts by weight, said filler being included in amounts between about 100 and 400 parts by weight and said plasticizers being included in amounts between about 125 and 175 parts by weight for each 100 parts of vinyl chloride polymer.

9. A home canning lid having a gasket consisting essentially of a vinyl chloride polymer, a powdered phenol-formaldehyde resin, a filler and a plasticizer, said filler being included in amounts between about 50 and 500 parts by weight and said plasticizer being included in amounts between about 100 and 200 parts by weight for each 100 parts of vinyl chloride polymer.

10. A home canning lid having a cellular gasket as set forth in claim 9, with said phenol-formaldehyde resin being included in amounts between about 1 and 10 parts by weight for each 100 parts of vinyl chloride polymer.

11. A home canning lid having a cellular gasket consisting essentially of a vinyl chloride polymer, a powdered phenol-formaldehyde resin, a barium sulfate filler, an epoxide plasticizer, a diester plasticizer, said phenolic resin being included in amounts between about 1 and 10 parts by weight, said filler being included in amounts between about 50 and 500 parts by weight and said plasticizers being included in amounts between about 100 and 200 parts by weight for each 100 parts of vinyl chloride polymer.

12. A home canning lid having a cellular gasket consisting esentially of a vinyl chloride polymer, a powdered phenol-formaldehyde resin, a barium sulfate filler, an epoxide plasticizer and an adipate plasticizer, said phenolic resin being included in amounts between about 2 and 8 parts by weight, said filler being included in amounts between about 100 and 400 parts by weight and said plasticizers being included in amounts between about 125 and 175 parts by weight for each 100 parts of vinyl chloride polymer.

References Cited
UNITED STATES PATENTS

| | | | |
|---|---|---|---|
| 3,032,826 | 5/1962 | Brillinger | 215—40 |
| 3,245,566 | 4/1966 | Szalay | 260—31.8 |

MURRAY TILLMAN, Primary Examiner

WILBERT J. BRIGGS, SR., Assistant Examiner

U.S. Cl. X.R.

215—40; 260—19, 23, 30.4, 31.8, 38, 41, 836